US010672044B2

(12) United States Patent
Inbaraj et al.

(10) Patent No.: US 10,672,044 B2
(45) Date of Patent: Jun. 2, 2020

(54) PROVISIONING OF HIGH-AVAILABILITY NODES USING RACK COMPUTING RESOURCES

(71) Applicant: AMERICAN MEGATRENDS INTERNATIONAL, LLC, Norcross, GA (US)

(72) Inventors: Joseprabu Inbaraj, Suwanee, GA (US); Muthukkumaran Ramalingam, Duluth, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 66 days.

(21) Appl. No.: 15/684,391

(22) Filed: Aug. 23, 2017

(65) Prior Publication Data

US 2019/0068439 A1 Feb. 28, 2019

(51) Int. Cl.
| | |
|---|---|
| *G06Q 30/04* | (2012.01) |
| *H04L 12/24* | (2006.01) |
| *H04L 12/911* | (2013.01) |
| *G06F 9/50* | (2006.01) |
| *G06Q 40/00* | (2012.01) |
| *H04M 15/00* | (2006.01) |
| *H04L 12/26* | (2006.01) |

(52) U.S. Cl.
CPC .......... *G06Q 30/04* (2013.01); *G06F 9/5077* (2013.01); *H04L 41/0806* (2013.01); *H04L 41/0896* (2013.01); *H04L 41/20* (2013.01); *H04L 47/70* (2013.01); *G06Q 40/00* (2013.01); *H04L 41/5051* (2013.01); *H04L 43/08* (2013.01); *H04M 15/66* (2013.01)

(58) Field of Classification Search
CPC ....... G06Q 30/04; G06Q 40/00; H04M 15/66; H04L 41/0896; H04L 41/0806; H04L 41/5051; H04L 43/08
See application file for complete search history.

(56) References Cited

U.S. PATENT DOCUMENTS

| | | | |
|---|---|---|---|
| 9,641,385 B1* | 5/2017 | Daniel | H04L 41/0806 |
| 2012/0110055 A1* | 5/2012 | Van Biljon | G06Q 30/04 |
| | | | 709/201 |
| 2015/0381426 A1* | 12/2015 | Roese | G06F 9/5077 |
| | | | 709/226 |

* cited by examiner

*Primary Examiner* — Kyung H Shin
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a pod manager. The pod manager receives a data object for composing a target composed-node. The pod manager determines that the data object includes an indication for high-availability. The pod manager accordingly composes a collection of composed-nodes based on the data object. The pod manager further configures the collection of composed-nodes to function as the target composed-node.

17 Claims, 9 Drawing Sheets

```
{
  "@odata.context": "/redfish/v1/$metadata#Templates/Members/$entity",
  "@odata.id": "/redfish/v1/Templates/1",
  "@odata.type": "#Template.v1_0_0.Template",
  "Id": "1",
  "Name": "template1",
  "Description": "template for node with E5 DDR4",
  "Type": "Node",
  "Payload": {
    "Name": "Node1",
    "Description": "Node for MegaRAC",
    "Processors": [{
      "Model": "Multi-Core Intel(R) Xeon(R) processor 7xxx Series",
      "TotalCores": 8,
      "AchievableSpeedMHz": 3700,
      "Oem": { "Brand": "E5" } }],
    "Memory": [{
      "CapacityMiB": 16384,
      "DataWidthBits": 64,
      "MemoryDeviceType": "DDR4"
    }],
    "LocalDrives": [ { "CapacityGiB": 300 } ]
  }
}
```

PROVISIONING OF HIGH-AVAILABILITY NODES USING RACK COMPUTING RESOURCES

BACKGROUND

Field

The present disclosure relates generally to computer systems, and more particularly, to a pod manager of a computing pod that can compose a collection of nodes to implement a high-availability node.

Background

The statements in this section merely provide background information related to the present disclosure and may not constitute prior art.

Technological advancements in networking have enabled the rise in use of pooled and/or configurable computing resources. These pooled and/or configurable computing resources may include physical infrastructure for cloud computing networks. The physical infrastructure may include one or more computing systems having processors, memory, storage, networking, etc. Management entities of these cloud computing networks may allocate portions of pooled and/or configurable computing resources in order to place or compose a node (machine or server) to implement, execute or run a workload. Various types of applications or application workloads may utilize this allocated infrastructure in a shared manner via access to these placed or composed nodes or servers.

A user may request that a high-availability node is built from the pooled computing resources. Therefore, there is a need for a mechanism that can compose a collection of composed-nodes and further provision necessary components to the collection of composed-nodes to implement the requested high-availability node.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a pod manager. The pod manager receives a data object for composing a target composed-node. The pod manager determines that the data object includes an indication for high-availability. The pod manager accordingly composes a collection of composed-nodes based on the data object. The pod manager further configures the collection of composed-nodes to function as the target composed-node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6 shows an exemplary data-object template.

DETAILED DESCRIPTION

Figure 1:
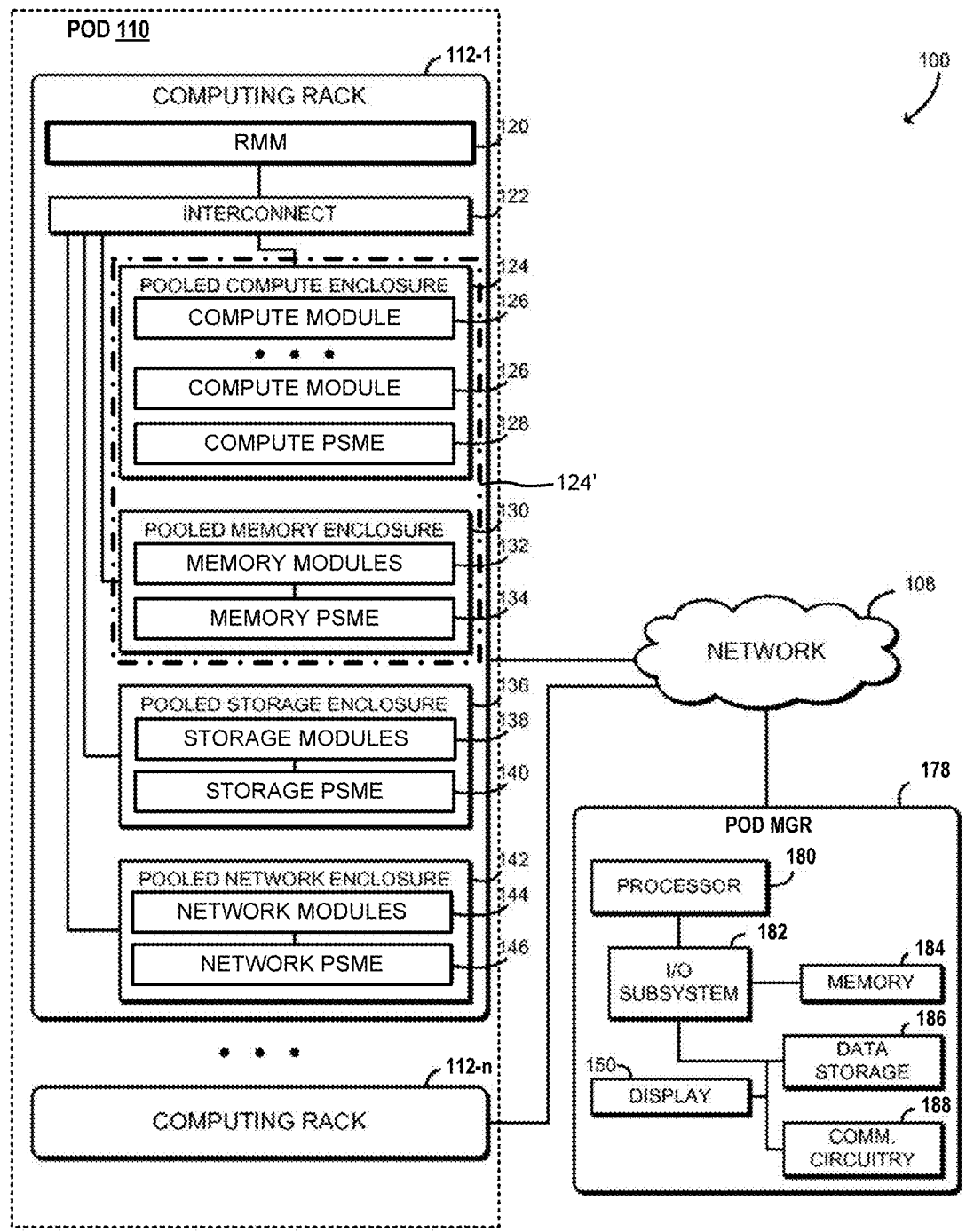
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a system 100 including computing racks 112-1 to 112-k and a pod manager 178 in communication over a network 108. The computing racks 112-1 to 112-k collectively constitute a computing pod 110, which is managed by the pod manager 178 as described infra. In general, a pod is a collection of computing racks within a shared infrastructure domain.

In use, computing applications or other workloads may be distributed over any number of the computing racks 112-1 to 112-k using available computing elements of the system 100 (e.g., compute nodes, memory, storage, or networking). The pod manager 178 manages resources of the system 100, for example including the current distribution and scheduling of workloads among the computing elements of the computing racks 112-1 to 112-k. The pod manager 178 can translate human input received into a number of machine-readable user-defined optimization rules. The pod manager 178 can optimize workload of the computing racks 112-1 to 112-k (e.g., optimize the placement and/or scheduling of workloads among the computing elements of the system 100) using the user-defined optimization rules well as predefined goals and constraints.

The system 100 may allow improved scheduling and placement of workload in a highly heterogeneous (e.g., disaggregated and/or modular) datacenter environment, with multiple internal (e.g., efficiency) and/or external (e.g., service delivery objective) constraints. Additionally, the system 100 may enable service providers to offer a wide range of service levels and templates to customers, due to the service provider's ability to optimally profit from all computing elements of the system 100 while managing operational cost tightly. Additionally, although described as being performed by the pod manager 178, in certain configurations some or all of those functions may be performed by other elements of the system 100, such as one or more computing racks 112-1 to 112-k.

Each of the computing racks 112-1 to 112-k may be embodied as a modular computing device that, alone or in combination with other computing racks 112-1 to 112-k, is capable of performing the functions described herein. For example, the computing rack 112-1 may be embodied as a chassis for rack-mounting modular computing units such as compute drawer/trays, storage drawer/trays, network drawer/trays, and/or traditional rack-mounted components such as servers or switches.

In this example, each of the computing racks 112-1 to 112-k may include a RMM 120 (rack management module) and one or more of an interconnect 122 coupled to a pooled compute enclosure 124, a pooled memory enclosure 130, a pooled storage enclosure 136, and a pooled network enclosure 142. The RMM 120 is responsible for managing the rack, which may include assigning IDs for pooled system management engines (PSMEs) and managing the rack power and cooling. Of course, each of the computing racks 112-1 to 112-k may include other or additional components, such as those commonly found in a server device (e.g., power distribution systems, cooling systems, or various input/output devices), in other embodiments.

In certain configurations, each of the pooled compute enclosure 124, the pooled memory enclosure 130, the pooled storage enclosure 136, and the pooled network enclosure 142 may be embodied as a tray, expansion board, or any other form factor, and may be further referred to as a "drawer." In such configurations, each enclosure/drawer may include any number of function modules or computing components, which may be allocated to an application or workload. As each of the computing racks 112-1 to 112-k includes drawers, individual components may be replaced or upgraded and may be "hot swappable." For example, in certain configurations, the pooled compute enclosure 124 may be embodied as a CPU tray including one or more compute modules 126. Each compute module 126 may include a blade having multiple processors and/or processing/controlling circuits. In such configurations, additional processing power may be added to the computing rack 112-1 by swapping out the pooled compute enclosure 124 with another pooled compute enclosure 124 including newer and/or more powerful processors.

The pooled compute enclosure 124 may be embodied as any modular computing unit such as a compute tray, expansion board, chassis, or other modular unit. As described supra, the pooled compute enclosure 124 may include one or more compute modules 126. Each compute module 126 may include a processor blade capable of performing the functions described herein. Each processor blade may include a single or multi-core processor(s), digital signal processor, microcontroller, or other processor or processing/controlling circuit. The compute modules 126 may be heterogeneous; for example, some of the compute modules 126 may be embodied as high-performance server processors and others of the compute modules 126 may be embodied as low-powered processors suitable for higher density deployment.

Further, in certain configurations, the pooled compute enclosure 124 may include a compute PSME 128. The compute PSME 128 may be embodied as any performance counter, performance monitoring unit, or other hardware monitor capable of generating, measuring, or otherwise capturing performance metrics of the compute modules 126 and/or other components of the pooled compute enclosure 124.

The pooled memory enclosure 130 may be embodied as any modular memory unit such as a memory tray, expansion board, chassis, or other modular unit. The pooled memory enclosure 130 includes memory modules 132. Each of the memory modules 132 may have a memory blade containing one or more memories capable of being partitioned, allocated, or otherwise assigned for use by one or more of the compute modules 126 of the pooled compute enclosure 124. For example, the memory blade may contain a pooled memory controller coupled to volatile or non-volatile memory, such as a large number of conventional RAM DIMMs. In operation, the pooled memory enclosure 130 may store various data and software used during operation of the computing rack 112-1 such as operating systems, virtual machine monitors, and user workloads.

Further, in certain configurations, the pooled memory enclosure 130 may include a memory PSME 134. The memory PSME 134 may be embodied as any performance counter, performance monitoring unit, or other hardware monitor capable of generating, measuring, or otherwise capturing performance metrics of the memory modules 132 and/or other components of the pooled memory enclosure 130.

In certain configurations, the computing rack 112-1 may not have a separate pooled memory enclosure 130. Rather, the pooled memory enclosure 130 may be incorporated into the pooled compute enclosure 124. As such, the computing rack 112-1 includes a combined pooled compute enclosure 124' that contains both processors and memories. In particular, in one configuration, a compute module 126 of the combined pooled compute enclosure 124' may include both processors and memories that function together. Accordingly, the compute PSME 128 manages both the processor resources and the memory resources. In another configuration, the combined pooled compute enclosure 124' may include one or more compute modules 126 as well as one or more memory modules 132.

Similarly, the pooled storage enclosure 136 may be embodied as any modular storage unit such as a storage tray, expansion board, chassis, or other modular unit. The pooled storage enclosure 136 includes storage modules 138. Each of the storage modules 138 may have a storage blade containing any type of data storage capable of being partitioned, allocated, or otherwise assigned for use by one or more of the compute modules 126 of the combined pooled compute enclosure 124'. For example, the storage blade may contain one or more memory devices and circuits, memory cards, hard disk drives, solid-state drives, or other data storage devices. Further, the storage modules 138 may be configured to store one or more operating systems to be initialized and/or executed by the computing rack 112-1.

Further, in certain configurations, the pooled storage enclosure 136 may include a storage PSME 140. The storage PSME 140 may be embodied as any performance counter, performance monitoring unit, or other hardware monitor capable of generating, measuring, or otherwise capturing performance metrics of the storage modules 138 and/or other components of the pooled storage enclosure 136.

Similarly, the pooled network enclosure 142 may be embodied as any modular network unit such as a network tray, expansion board, chassis, or other modular unit. The pooled network enclosure 142 includes network modules 144. Each of the network modules 144 may have a blade containing any communication circuit, device, or collection thereof, capable of being partitioned, allocated, or otherwise assigned for use by one or more of the compute modules 126 of the combined pooled compute enclosure 124'. For example, the network blade may contain any number of network interface ports, cards, or switches. In certain configurations, the network modules 144 may be capable of operating in a software-defined network (SDN). The network modules 144 may be configured to use any one or more communication technology (e.g., wired or wireless communications) and associated protocols (e.g., Ethernet, Bluetooth®, Wi-Fi®, WiMAX, etc.) to effect such communication.

Further, in certain configurations, the pooled network enclosure 142 may include a network PSME 146. The network PSME 146 may be embodied as any performance counter, performance monitoring unit, or other hardware monitor capable of generating, measuring, or otherwise capturing performance metrics of the network modules 144 and/or other components of the pooled network enclosure 142.

In certain configurations, the combined pooled compute enclosure 124', the pooled storage enclosure 136, and the pooled network enclosure 142 are coupled to each other and to other computing racks 112-1 to 112-k through the interconnect 122. The interconnect 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate data transfer between the computing elements of the computing rack 112-1. For example, in certain configurations, the interconnect 122 may be embodied as or include a silicon photonics switch fabric and a number of optical interconnects. Additionally or alternatively, in certain configurations, the interconnect 122 may be embodied as or include a top-of-rack switch.

The RMM 120 may be implemented by any computing node, micro-controller, or other computing device capable of performing workload management and orchestration functions for the computing rack 112-1 and otherwise performing the functions described herein. For example, the RMM 120 may be embodied as one or more computer servers, embedded computing devices, managed network devices, managed switches, or other computation devices. In certain configurations, the RMM 120 may be incorporated or otherwise combined with the interconnect 122, for example in a top-of-rack switch.

As described supra, in certain configurations, the system 100 may include a pod manager 178. A pod manager 178 is configured to provide an interface for a user to orchestrate, administer, or otherwise manage the system 100. The pod manager 178 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. In certain configurations, the pod manager 178 may be embodied as a distributed system, for example with some or all computational functions performed by the computing racks 112-1 to 112-k and with user interface functions performed by the pod manager 178. Accordingly, although the pod manager 178 is illustrated in FIG. 1 as embodied as a single server computing device, it should be appreciated that the pod manager 178 may be embodied as multiple devices cooperating together to facilitate the functionality described infra. As shown in FIG. 1, the pod manager 178 illustratively includes a processor 180, an input/output subsystem 182, a memory 184, a data storage device 186, and communication circuitry 188. Of course, the pod manager 178 may include other or additional components, such as those commonly found in a workstation (e.g., various input/output devices), in other embodiments. Additionally, in certain configurations, one or more of the illustrative components may be incorporated in, or otherwise form a portion of, another component. For example, the memory 184, or portions thereof, may be incorporated in the processor 180 in certain configurations.

The processor 180 may be embodied as any type of processor capable of performing the functions described herein. The processor 180 may be embodied as a single or multi-core processor(s), digital signal processor, micro-controller, or other processor or processing/controlling circuit. Similarly, the memory 184 may be embodied as any type of volatile or non-volatile memory or data storage capable of performing the functions described herein. In operation, the memory 184 may store various data and software used during operation of the pod manager 178 such as operating systems, applications, programs, libraries, and drivers. The memory 184 is communicatively coupled to the processor 180 via the I/O subsystem 182, which may be embodied as circuitry and/or components to facilitate input/output operations with the processor 180, the memory 184, and other components of the pod manager 178. For example, the I/O subsystem 182 may be embodied as, or otherwise include, memory controller hubs, input/output control hubs, integrated sensor hubs, firmware devices, communication links (i.e., point-to-point links, bus links, wires, cables, light guides, printed circuit board traces, etc.) and/or other components and subsystems to facilitate the input/output operations. In certain configurations, the I/O subsystem 182 may form a portion of a system-on-a-chip (SoC) and be incorporated, along with the processor 180, the memory 184, and other components of the pod manager 178, on a single integrated circuit chip.

The data storage device 186 may be embodied as any type of device or devices configured for short-term or long-term storage of data such as, for example, memory devices and circuits, memory cards, hard disk drives, solid-state drives, or other data storage devices. The communication circuitry 188 of the pod manager 178 may be embodied as any communication circuit, device, or collection thereof, capable of enabling communications between the pod manager 178, the computing racks 112-1 to 112-k, and/or other remote devices over the network 108. The communication circuitry 188 may be configured to use any one or more communication technology (e.g., wired or wireless communications) and associated protocols (e.g., Ethernet, Bluetooth®, Wi-Fi®, WiMAX, etc.) to effect such communication.

The pod manager 178 further includes a display 190. The display 190 of the pod manager 178 may be embodied as any type of display capable of displaying digital information such as a liquid crystal display (LCD), a light emitting diode (LED), a plasma display, a cathode ray tube (CRT), or other type of display device. As further described below, the display 190 may present an interactive graphical user interface for management of the system 100.

As described infra, the computing racks 112-1 to 112-k and the pod manager 178 may be configured to transmit and receive data with each other and/or other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), a cellular network, and/or a publicly-accessible, global network such as the Internet. As such, the network 108 may include any number of additional devices, such as additional computers, routers, and switches, to facilitate communications among the devices of the system 100.

Although each of the computing racks 112-1 to 112-k has been illustrated as including a single combined pooled compute enclosure 124', a single pooled storage enclosure 136, and a single pooled network enclosure 142, it should be understood that each of the computing racks 112-1 to 112-k may include any number and/or combination of those modular enclosures.

Figure 2:
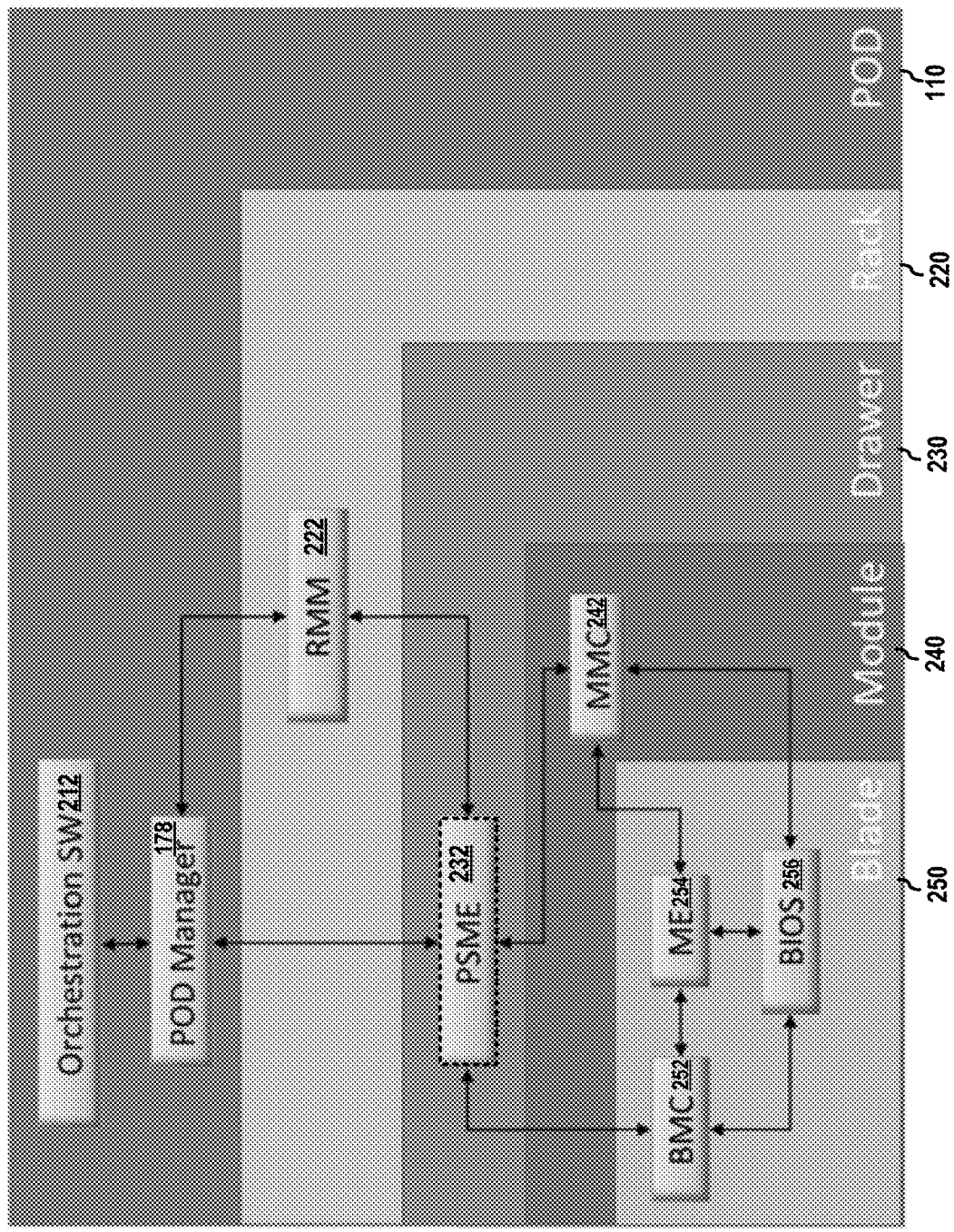
FIG. 2 is a diagram illustrating a logical hierarchy of a computer system.

FIG. 2 is a diagram 200 illustrating a logical hierarchy of the system 100. As described supra, the pod manager 178 manages the computing pod 110. An orchestration module 212 may send a request to the pod manager 178 for a composed-node. Accordingly, the pod manager 178 may allocate resources of the computing pod 110 to build the requested composed-node. A composed-node may include resources from compute, memory, network, and storage modules.

Further, as shown, the computing pod 110 includes at least one computing rack 220. Each computing rack 220, which may be any one of the computing racks 112-1 to 112-k, includes a RMM 222 (e.g., the RMM 120). The computing rack 220 also includes at least one computing drawer 230, each of which may be any one of the combined pooled compute enclosure 124', the pooled storage enclosure 136, and the pooled network enclosure 142. In certain configurations, each computing drawer 230 may include a PSME 232, which may be any corresponding one of the compute PSME 128, the memory PSME 134, the storage PSME 140, and the network PSME 146.

The computing drawer 230 also includes at least one module 240, which may be any corresponding one of the compute module 126, the memory module 132, the storage module 138, and the network module 144. Each module 240 includes a MMC 242 (module management controller) that services the module 240 and manages the blades in the module 240.

Each module 240 also includes at least one computing blade 250. Each computing blade 250 includes a BMC 252 (baseboard management controller), a ME 254 (management engine), and a BIOS 256 (Basic Input/Output System). The PSME 232 is in communication with the MMC 242 and the BMC 252. The BMC 252 is in communication with the BIOS 256 and the ME 254.

In particular, the pod manager 178 is responsible for discovery of resources in the computing pod 110, configuring the resources, power and reset control, power management, fault management, monitoring the resources usage. The pod manager 178 interacts with the RMM 120 and the PSME 232 to create representation of the computing pod 110. The pod manager 178 allows composing a physical node to match the logical node requirements specified by the solution stack. Such composition is able to specify a system at a sub-composed node granularity.

The pod manager 178 may be connected to the RMM 222 and the PSME 232 through the network 108 (e.g., a private network). A management related activity such as reconfiguration may be performed after establishing a secure communication channel between the pod manager 178 and the PSME 232 and between the pod manager 178 and the RMM 222.

The RMM 222 may be responsible for handling infrastructure functions of the computing rack 220 such as power, cooling, and assigning PSME IDs. The RMM 222 may also support power monitoring at rack level. This feature helps the pod manager 178 take actions to keep the rack within its power budget.

As described supra, the computing rack 220 is made-up of drawers such as the computing drawer 230. The computing rack 220 provides a mechanism to manage rack level end point components down to the drawer level. In particular, the PSME 232 provides management interface to manage the modules/blades (e.g., the module 240/the computing blade 250) at a drawer level. In certain configurations, the PSME 232 may service multiple drawers, as long as the drawer is uniquely addressable and provides the necessary instrumentation. For example, if each drawer has a microcontroller to provide the necessary instrumentation for all drawer requirements (such as module presence detection) and is interfaced to the RMM 222, then the PSME 232 could physically run in the RMM 222 and represent each drawer instance.

In certain configurations, the PSME 232 may be responsible for drawer identification management and for communicating with the BMC 252 and the MMC 242 perform node-level management. If the RMM 222 is not present in the computing rack 220, the PSME 232 in the computing rack 220 would provide the RMM functionality. The PSME 232 may also provide individual node reset support including power on and power off of the drawer and modules (e.g., the module 240 and the computing blade 250) that are managed by the PSME 232.

Figure 3:
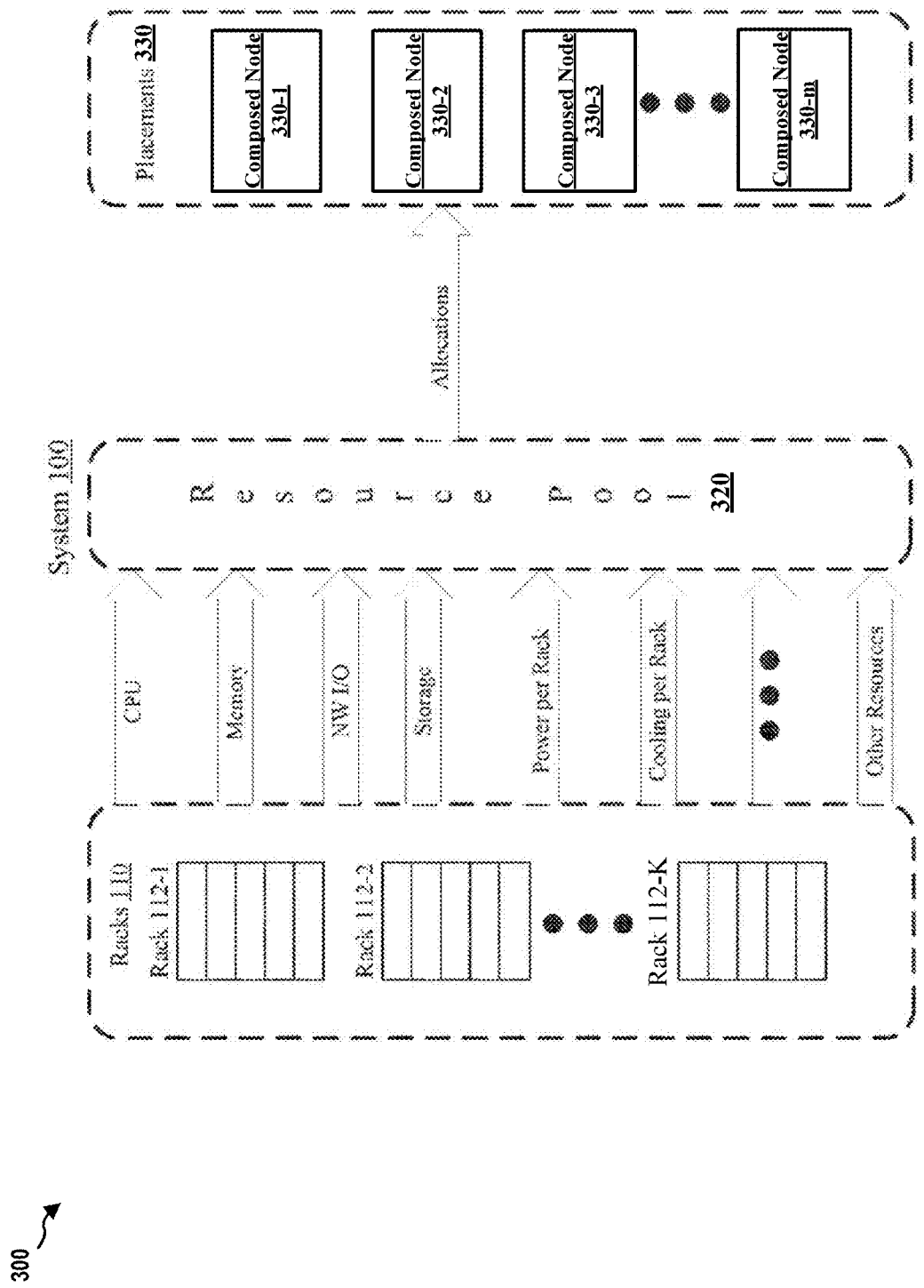
FIG. 3 is a diagram illustrating allocation of resources of a computer system.

FIG. 3 is a diagram 300 illustrating allocation of resources of the system 100. In certain configurations, as described supra, machines (or servers) can be logically composed from pools of disaggregated physical elements of the system 100 to implement or execute incoming workload requests. These composed-nodes may be deployed in large data centers. The composed-nodes may also be part of software defined infrastructure (SDI). SDI-enabled data centers may include dynamically composed-nodes to implement or execute workloads.

As described supra, the system 100 may include the computing racks 112-1 to 112-k, where k is a positive integer. Each rack may include various configurable computing resources. These configurable computing resources may include various types of disaggregated physical elements. Types of disaggregated physical elements may include, but are not limited to, CPU types (e.g., the compute modules 126), memory types (e.g., the memory modules 132), storage types (e.g., the storage modules 138), network I/O types (e.g., the network modules 144), power types (e.g., power bricks), cooling types (e.g., fans or coolant) or other types of resources (e.g., network switch types). These configurable computing resources may be made available (e.g., to a resource manager or controller) in a resource pool 320.

In certain configurations, various configurable computing resources of the system 100 may be made available in the resource pool 320 for allocation to build a composed-node. A composed-node, for example, may be composed to implement or execute a workload. At least a portion (e.g., a configuration) of available configurable computing resources in the resource pool may be allocated to support placements 330. As shown in FIG. 3, placements 330 include composed-nodes 332-1 to 332-m, where "m" is any positive integer.

As described infra, certain logic and/or features of the system 100 may also be capable of monitoring operating attributes for each configurable computing resource allocated to compose or place a composed-node while the composed-node implements, runs or executes a workload.

According to some examples, each of the composed-nodes 332-1 to 332-m may be used to run one or more virtual machines (VMs). For these examples, each of the one or VMs may be allocated a portion of a composed-node (i.e., allocated configurable computing resources). In other examples, a composed-node may be allocated directly to a given VM.

Figure 4:
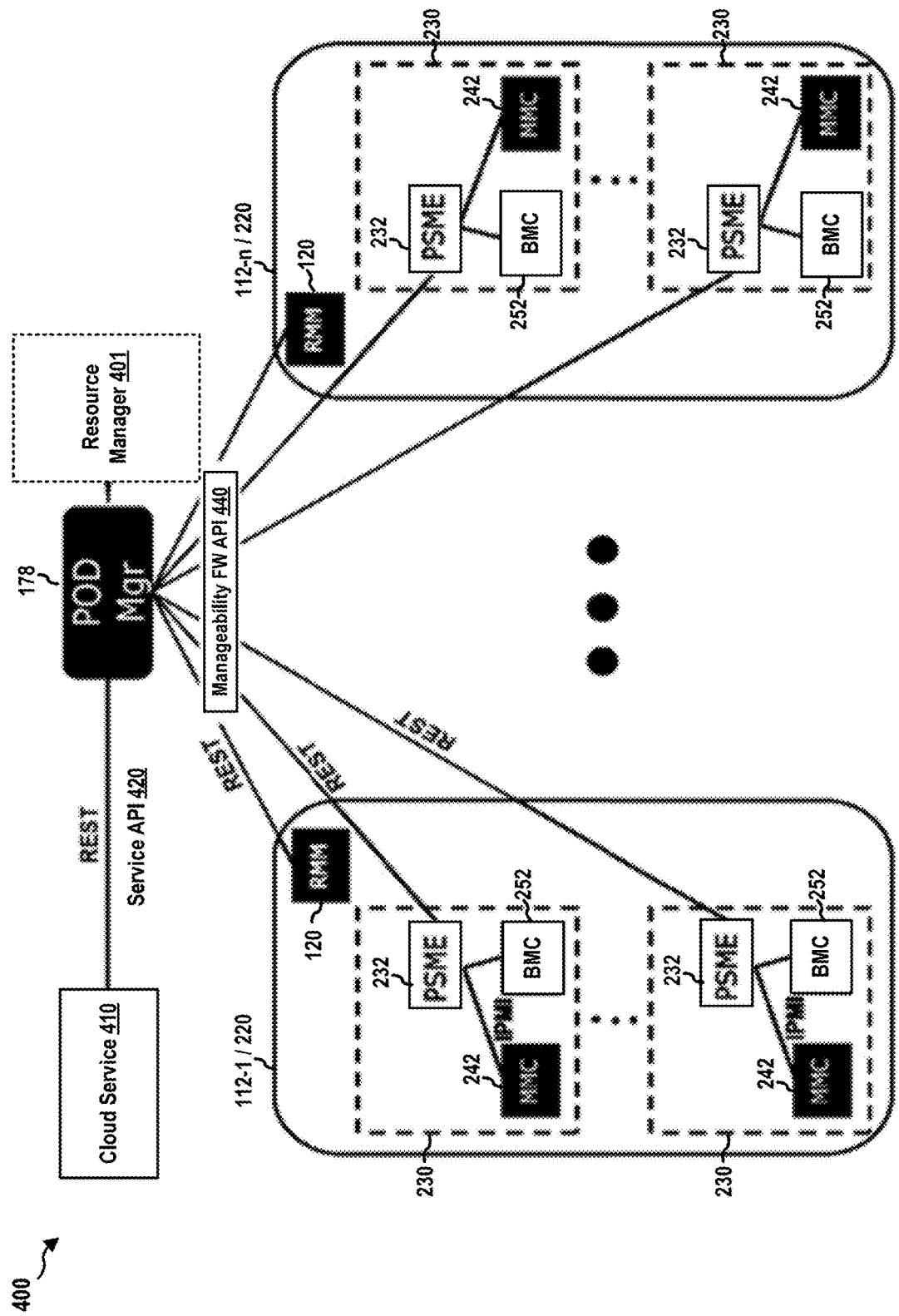
FIG. 4 is a diagram illustrating a rack management structure of a computer system.

FIG. 4 is a diagram illustrating a rack management structure 400 of the system 100. In some examples, as shown in FIG. 4, the rack management structure 400 includes various managers and application programing interfaces (APIs). For example, a cloud service 410 may interface through a service API 420 (e.g., orchestration interface) as a common service application interface (API) to communicate with the pod manager 178. The pod manager 178 manages the computing racks 112-1 to 112-k including various types of disaggregated physical elements (e.g., the computing drawer 230).

In certain configurations, the pod manager 178 may include a resource manager 401 that includes logic and/or features capable of allocating these disaggregated physical elements (e.g., the compute modules 126, the memory modules 132, the storage modules 138, the network modules 144) responsive to a request from a cloud service 410 to allocate configurable computing resources to a composed-node to implement or execute a workload that may be associated with the cloud service 410. The workload, for example, may be an application workload such as, but not limited to, video processing, encryption/decryption, a web server, content delivery or a database. The resource manager 401 may maintain a resource catalog to track what configurable computing resources have been allocated and also what configurable computing resources may be available to allocation responsive to subsequent requests from the cloud service 410.

In certain configurations, the pod manager 178 may utilize a manageability FW API 440 (firmware), which is a Representational State Transfer (REST)-based API, to access to the configurable computing resources at the computing racks 112-1 to 112-k. This access may include access to disaggregated physical elements maintained at racks as well as metadata for technologies deployed in these racks that may include gathered operating attributes for these disaggregated physical elements. In particular, the manageability FW API 440 provides access to the RMM 120 and the PSME 232 (e.g., the compute PSME 128, the memory PSME 134, the storage PSME 140, and the network PSME 146) of each computing drawer 230 in the computing racks 112-1 to 112-k.

REST-based or RESTful Web services are one way of providing interoperability between computer systems on the Internet. REST-compliant Web services allow requesting systems to access and manipulate textual representations of Web resources using a uniform and predefined set of stateless operations. In a RESTful Web service, requests made to a resource's URI will elicit a response that may be in XML, HTML, JSON or some other defined format. The response may confirm that some alteration has been made to the stored resource, and it may provide hypertext links to other related resources or collections of resources. Using HTTP, as is most common, the kind of operations available include those predefined by the HTTP verbs GET, POST, PUT, DELETE and so on. By making use of a stateless protocol and standard operations, REST systems aim for fast performance, reliability, and the ability to grow, by re-using components that can be managed and updated without affecting the system as a whole, even while it is running.

In certain configurations, the RMM 120 may also provide access to the physical and logical asset landscapes or mapping in order to expedite identification of available assets and allocate configurable computing resources responsive to requests to compose or place a composed-node to implement or execute a workload.

In certain configurations, the RMM 120 may provide a rack level user interface in order to fulfill several basic functions, such as discovery, reservation, polling, monitoring, scheduling and usage. Also, the RMM 120 may be utilized for assembly of higher order computing resources in a multi-rack architecture (e.g., to execute a workload).

In certain configurations, the RMM 120 may report assets under its management to the pod manager 178 that includes the resource manager 401. For these examples, resource manager 401 may include logic and/or features capable of assisting the pod manager 178 in aggregating an overall physical asset landscape structure from all racks included in the pod of racks managed by the pod manager 178 into a single multi-rack asset. According to some examples, the RMM 120 may also receive and/or respond to requests from the pod manager 178 via the manageability FW API 440 (i.e., a REST API).

According to some examples, the pod manager 178 may receive a request to allocate a portion of the configurable computing resources maintained in the computing racks 112-1 to 112-k. For these examples, the pod manager 178 may receive the request through the service API 420 in a standardized protocol format such as the Open Virtualization Format (OVF). OVF may include hints (e.g., metadata) of a type of workload. The pod manager 178 may be capable of determining what hardware configuration may be needed to place or compose a composed-node to implement or execute the workload. The pod manager 178 may then forward the request and indicate the hardware configuration possibly needed to the resource manager 401. For example, a configuration of configurable computing resources including various types of disaggregate physical elements such as CPUs, memory, storage and NW I/O needed to implement, run, or execute the workload. The pod manager 178 may discover and communicate with the RMM 222 of each computing rack 220 and the PSME 232 of each computing drawer 230.

The BMC 252 may support Intelligent Platform Management Interface standard (IPMI). IPMI is an industry standard and is described in, e.g., "IPMI: Intelligent Platform Management Interface Specification, Second Generation, v.2.0, Feb. 12, 2004," which is incorporated herein by reference in its entirety. IPMI defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc. The BMC 252 may be in communication with the computing blade 250 and may manage the computing blade 250.

Further, the PSME 232 may include REST services. The pod manager 178 may access the REST services through the manageability FW API 440. The REST services provide the REST-based interface that allows full management of the PSME 232, including asset discovery and configuration. For example, the REST services may be a REDFISH® server. REDFISH® is an open industry standard specification and schema that specifies a RESTful interface and utilizes JSON and OData for the management of scale-out computing servers and for accessing data defined in model format to perform out-of-band systems management. The REST services may support some or all of the requirements of "Redfish Scalable Platforms Management API Specification, Version: 1.0.0, Document Identifier: DSP0266, Date: 2015 Aug. 4," which is incorporated herein in its entirety by reference.

When the computing drawer 230 is a compute drawer, the PSME 232 may provide to the pod manager 178 information of and functions to operate on a processor collection resource, which provides collection of all processors available in a blade.

When the computing drawer 230 is a memory drawer or a compute drawer including a memory), the PSME 232 may provide to the pod manager 178 information of and functions to operate on a memory collection resource, which provides collection of all memory modules installed in a computer system. The PSME 232 may also provide information of and functions to operate on a memory chunks collection resource, which provides collection of all memory chunks in a computer system. The PSME 232 may further provide to the pod manager 178 information of and functions to operate on a storage adapters collection resource, which provides collection of all storage adapters available in a blade. The PSME 232 may also provide to the pod manager 178 information of and functions to operate on a storage adapter resource, which provides detailed information about a single storage adapter identified by adapter ID. The PSME 232 may provide to the pod manager 178 information of and functions to operate on a storage device collection resource, which provides collection of all storage devices available in a storage adapter. The PSME 232 may also provide to the pod manager 178 information of and functions to operate on a device resource, which provides detailed information about a single storage device identified by device ID.

When the computing drawer 230 is a networking drawer, the PSME 232 may provide to the pod manager 178 information of and functions to operate on a Blade Network Interface resource, which provides detailed information about a network interface identified by NIC ID.

In addition, the PSME 232 may provide to the pod manager 178 information of and functions to operate on a manager collection resource, which provides collection of all managers available in the computing drawer 230. The PSME 232 may provide to the pod manager 178 information of and functions to operate on chassis collection resource, a chassis resource. a computer systems collection, and a computer system resource, The PSME 232 may provide to the pod manager 178 information of and functions to operate on one or more of the following: a manager resource that provides detailed information about a manager identified by manager ID; a switch collection resource that provides collection of all switches available in a fabric module; a switch resource that provides detailed information about a switch identified by switch ID; a switch port collection resource that provides collection of all switch port available in a switch; a switch port resource that provides detailed information about a switch port identified by port ID; a switch ACL collection resource that provides collection of all Access Control List (ACL) defined on switch; a switch ACL resource that provides detailed information about a switch Access Control List defined on switch; a switch ACL rule collection resource that provides collection of all rules for Access Control List (ACL) defined on switch; a switch ACL rule resource that provides detailed information about a switch ACL rule defined identified by rule ID; a switch port static MAC collection resource that provides collection of all static MAC forwarding table entries; a switch port static MAC resource that provides detailed information about a static MAC address forward table entry; a network protocol resource that provides detailed information about all network services supported by a manager identified by manager ID; a Ethernet interface collection resource that provides collection of all Ethernet interfaces supported by a manager identified by manager ID or included in a blade identified by blade ID; a Ethernet interface resource that provides detailed information about a Ethernet interface identified by NIC ID; a VLAN Network Interface collection resource that provides collection of all VLAN network interfaces existing on a switch port identified by port ID or network interface identified by NIC ID; a VLAN Network Interface resource that provides detailed information about a VLAN network interface identified by VLAN ID; an event service resource responsible for sending events to subscribers; an event subscription collection, which is a collection of Event Destination resources; an event subscription contains information about type of events user subscribed for and should be sent; and a definition of event array that is POST-ed by Event Service to active subscribers, event array representing the properties for the events themselves and not subscriptions or any other resource, each event in this array having a set of properties that describe the event.

Figure 5:
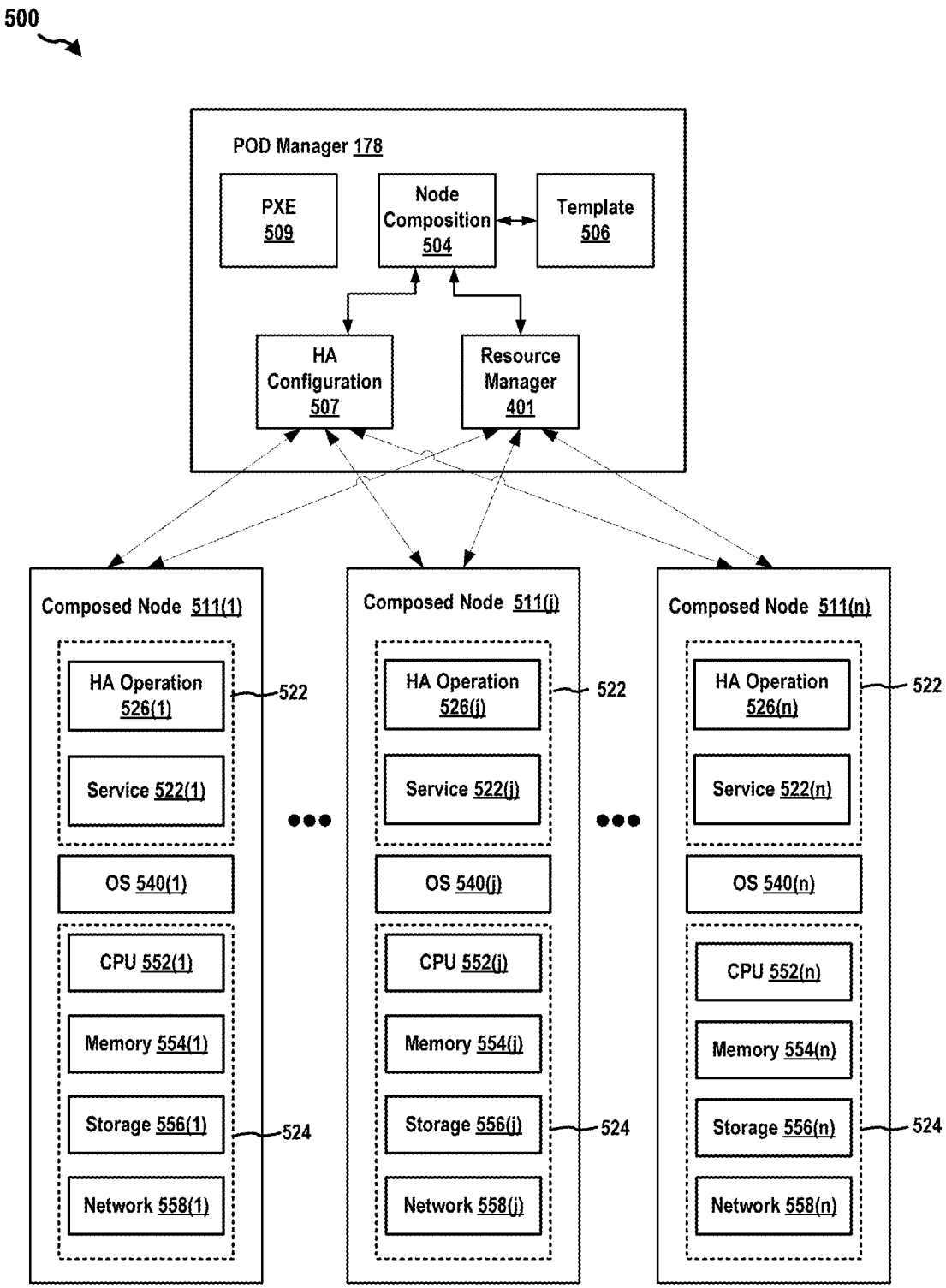
FIG. 5 is diagram illustrating a pod manager managing multiple composed-nodes.

FIG. 5 is diagram 500 illustrating a pod manager managing multiple composed-nodes. The pod manager 178 includes, among other components, a resource manager 401, a node-composing component 504, a template component 506, a high-availability configuration component 507, and a PXE server 509 (Preboot Execution Environment server).

The node-composing component 504 may provide an interface (e.g., a user interface, an application program interface (API), etc.) through which a user or a computing device (i.e., a requester) can request the node-composing component 504 to compose a target composed-node and inform the node-composing component 504 requirements for the target composed-node. The requirements may indicate the type of composed-node needed (e.g., a compute composed-node, a storage composed-node, a network composed-node, etc.), the computing powers required, the memory capacity, the storage capacity, the network throughput, etc.

Based on the requirements, the node-composing component 504 may select a target data-object template from data-object templates available at the template component 506 for constructing a node that satisfies the requirements. The data-object templates at the template component 506 each define the parameters for composing a node. For example, a data-object template may specify the model, number, capacity/speed of the processors, memories, disk drives, and network interfaces.

After selecting the target data-object template, the node-composing component 504 generates a data object based on the target data-object template. The data object is specific to the resource manager 401 for creating a particular composed-node satisfying the requirements of the requester. Subsequently, the node-composing component 504 sends the generated data object to the resource manager 401. The resource manager 401 then, according to the data object, communicates with the computing racks 112-1 to 112-k to allocate resources from the resource pool 320 and to build the target composed-node.

FIG. 6 shows an exemplary data-object template 600 in JavaScript Object Notation (JSON) format. The data-object template 600 may be one of the data-object templates provided by the template component 506. The data-object template 600 includes an OData information section 610, a template information section 620, and a payload section 630. OData (Open Data Protocol) is an Organization for the Advancement of Structured Information Standards (OASIS) standard that defines a set of best practices for building and consuming RESTful APIs. "OData Version 4.0. 2 Jun. 2016" specification is incorporated herein by reference in its entirety The OData information section 610 includes a context (i.e., "Aodata.context") property that tells a generic client how to find the service metadata describing the types exposed by the service and describes the source of the payload. The OData information section 610 further includes a resource identifier (i.e., @odata.id) that identifies the resource. The OData information section 610 also includes a type (i.e., @odata.type) property that specifies the type of the resource as defined within, or referenced by, the metadata document. The template information section 620 indicates an ID, a name, a description, and a type of the data-object template 600. The name is a user defined name of the template. The description is a user defined description of the template. The type may be "node," "reset," "boot," "config," etc. The payload section 630 includes a payload of a data object (e.g., in JSON format).

Figure 7:
FIG. 7 shows an exemplary data object.

FIG. 7 shows an exemplary data object 700 in JSON format. The node-composing component 504 may obtain the data-object template 600 from the template component 506 and, accordingly, may construct the data object 700. The node-composing component 504 may send the data object 700 to the resource manager 401, requesting the resource manager 401 to accordingly build a requested composed-node. The requirements described in the data object 700 may be treated by the resource manager 401 as a minimal required value, so the resulting composed-node may have better parameters than requested. In this example, as shown in FIG. 7, the requested name for the composed-node is "Node1." The requested description of the composed-node is "Node for MegaRAC." Regarding the requested processors, the model is "Multi-Core Intel® Xeon® processor 7xxx Series." The requested number of cores of a processor is 8. The requested achievable speed of a processor is 3700 MHz. The requested brand is "E5" Regarding the requested memory, the requested capacity is 16384 MiB. The requested data width bits are 64. The requested memory device type is DDR4. Regarding the requested local drives, the requested capacity is 300 GiB.

Referring back to FIG. 5, as described supra, the node-composing component 504 receives the requirements for a target composed-node (e.g., through the interface provided by the node-composing component 504) from a requester such as a user or another computing device. In addition to what was described supra, the requirements may also include an indication of an application or functionality (e.g., a database server) of the target composed-node. Based on this indication, the node-composing component 504 may select a corresponding data-object template and generate a corresponding data object that specifies one or more service components to be installed on the target composed-node for implementing the requested application or functionality.

In this example, the resource manager 401, based on the data object received from the node-composing component 504, uses the resource of the computing racks 112-1 to 112-k to build a composed-node 511(1), which may be one of the composed-nodes 332-1 to 332-m. The resource manager 401 may further load a boot agent on the composed-node 511(1). The boot agent is configured to download an OS 540(1) and a service component 522(1) from the PXE server 509 and to install the OS 540(1) and the service component 522(1) on the composed-node 511(1). More specifically, the service component 522(1) is installed on the OS 540(1) to implement the application or functionality of the target composed-node. In this example, the OS 540(1) may be a LINUX® OS and the service component 522(1) may be a MYSQL® database.

In addition, the requirements from the requester and received at the node-composing component 504 may also include an indication that the target composed-node is a high-availability node. The requirements may include an indication of a degree of high-availability requested as well as an indication for a high-availability configuration to be used. In particular, the high-availability configuration may be an active-active configuration or an active-passive configuration.

To satisfy these additional high-availability requirements, when selecting a data-object template, the node-composing component 504 may choose a data-object template that specifies the parameters for creating a collection of composed-nodes to implement the requested high-availability node. Further, based on the degree (e.g., 1 to 10, 10 being the highest degree) of the requested high-availability, the node-composing component 504 may determine the number of composed-nodes in the collection.

In this example, the node-composing component 504 generates a data object for building a high-availability node based on the selected data-object template and sends the generated data object to the resource manager 401. Accordingly, the resource manager 401 allocates resources of the computing racks 112-1 to 112-$k$ to build composed-nodes 511(1)-511($n$), n being an integer greater than 1. As described supra, the number of composed-nodes (i.e., n) may be determined by the node-composing component 504 based on the requested degree of high-availability. When the degree is high (e.g., 10 out of 10), the node-composing component 504 may determine that n is 10, 20, or 50, etc. When the degree is low (e.g., 1 out of 10), the node-composing component 504 may determine that n is 2, or 4, etc.

In addition, based on the degree of the requested high-availability (e.g., when the degree is greater than 8 out of 10), the node-composing component 504 may also determine to allocate resources from different racks from the computing racks 112-1 to 112-$k$ to build different nodes of the composed-nodes 511(1)-511($n$). From example, the node-composing component 504 may allocate resources from respective one of selected n racks from the computing racks 112-1 to 112-$k$ to build the respective one of the composed-nodes 511(1)-511($n$).

The resource manager 401 may allocate the same hardware elements to each node of the composed-nodes 511(1)-511($n$). That is, the hardware platform 524 of each node contains the same hardware elements. In particular, each set of the CPUs 552(1)-552($n$) is the same (e.g., same brand, model, speed, capacity, etc.). Each set of the memories 554(1)-554($n$) is the same (e.g., same brand, model, capacity, etc.). Each set of the storages 556(1)-556($n$) is the same (e.g., same brand, model, capacity, etc.). Each set of the network elements 558(1)-558($n$) is the same (e.g., same brand, model, capacity, etc.).

The resource manager 401 may receive a data object that specifies that OSes 540(1)-540($n$), service components 522(1)-522($n$), and high-availability operation components 526(1)-526($n$) are to be installed on the composed-nodes 511(1)-511($n$), respectively. Accordingly, the high-availability configuration component 507 of the pod manager 178 further configures the composed-nodes 511(1)-511($n$) to install the OSes 540(1)-540($n$), service components 522(1)-522($n$), and high-availability operation components 526(1)-526($n$). In particular, the high-availability configuration component 507 may install a boot agent on each of the composed-nodes 511(1)-511($n$). The boot agent on each one of the composed-nodes 511(1)-511($n$) is configured by the high-availability configuration component 507 to download the same OS, the same service component, the same high-availability operation component from the PXE server 509 to each composed-node and to install them. As such, the OSes 540(1)-540($n$), the service components 522(1)-522($n$), and the high-availability operation components 526(1)-526($n$) are installed and initiated on the composed-nodes 511(1)-511($n$), respectively. More specifically, each of the OSes 540(1)-540($n$) is the same or identical (e.g., having the exact same programs, data, and configuration, etc.), and each of the service components 522(1)-522($n$) is the same or identical (e.g., having the exact same programs, data, and configuration, etc.). In this example, each of the OSes 540(1)-540($n$) may be the same brand, version of LINUX® with the identical data, configurations, etc., and each of the service components 522(1)-522($n$) may be the same version of MYSQL® with identical data, configurations, etc.

Further, the high-availability configuration component 507 configures the high-availability operation components 526(1)-526($n$) to operate the composed-nodes 511(1)-511($n$) to function as a high-availability node. As described supra, a requester may request that a high-availability node operates in an active-active configuration or an active-passive configuration. When the requester requests an active-active configuration, the high-availability configuration component 507 may instruct the high-availability operation components 526(1)-526($n$) to make all nodes of the composed-nodes 511(1)-511($n$) active and running. Further, the high-availability configuration component 507 configures at least one of the high-availability operation components 526(1)-526($n$) to provide a load balancing function. In this example, the high-availability operation component 526(1) is selected to function as the load balancer. Accordingly, the high-availability operation component 526(1) is configured to receive all tasks or requests directed to the composed-nodes 511(1)-511($n$). From a user's perspective, the user perceives the composed-nodes 511(1)-511($n$) as a single high-availability node and has no knowledge of any one of the composed-nodes 511(1)-511($n$) individually. Then, based on an algorithm (e.g., Round Robin) for balancing the load, the high-availability operation component 526(1) selects a node of the composed-nodes 511(1)-511($n$) and forwards the task or request to the selected composed-node for handling. In this example, the high-availability operation component 526(1) receives a request to update a data entry in the databases of the service components 522(1)-522($n$). Based the load balancing algorithm, the high-availability operation component 526(1) selects the service component 522($j$) to handle the task and forwards the request to the service component 522($j$). Accordingly, the service component 522($j$) updates the data entry in its copy of the database.

Further, the high-availability operation components 526(1)-526($n$) are configured to maintain the redundancy of the service components 522(1)-522($n$) and the OSes 540(1)-540($n$). That is, each of the service components 522(1)-522($n$) is redundant to each other; each of the OSes 540(1)-540($n$) is redundant to each other. Therefore, any changes made to a particular one of the service components 522(1)-522($n$) or a particular one of OSes 540(1)-540($n$) will be made, by the high-availability operation components 526(1)-526($n$), to all the other ones of the service components 522(1)-522($n$) or the OSes 540(1)-540($n$). In this example, once the data entry is updated in the database of the service component 522($j$), the high-availability operation component 526($j$) informs the database changes made to all the other ones of the high-availability operation components 526(1)-526($n$). Each of the other ones of the high-availability operation components 526(1)-526($n$), accordingly, makes the same changes to the respective database on the same composed-node as that high-availability operation component.

When the requester requests an active-passive configuration, the high-availability configuration component 507 configures some nodes of the composed-nodes 511(1)-511($n$) to be running/active and the rest to be standby/passive. In this example, the composed-nodes 511(1)-511(*j*) are configured to operate initially as active nodes, while the composed-nodes 511(*j*+1)-511(*n*) are configured to operate initially as passive nodes. When a composed-node is in the passive mode, at least one of the operative components in the active mode is disabled or not operative. In certain configurations, a passive composed-node may be in a sleep mode or energy-save mode. As described infra, the passive (or failover) composed-node serves as a backup that is ready to take over as soon as an active (primary) composed-node gets disconnected or is unable to serve. In certain configurations, the high-availability operation components may operate the composed-nodes 511(1)-511(*j*) in a load balancing manner as described supra.

Further, similar to what was described supra, the high-availability operation components 526(1)-526(*n*) are configured to maintain the redundancy of the service components 522(1)-522(*n*) and the OSes 540(1)-540(*n*). In particular, each of the passive composed-nodes are updated to host identical data and programs as the active composed-nodes.

The high-availability operation components 526(1)-526(*j*) monitor the operation conditions of the composed-nodes 511(1)-511(*j*), respectively. Each of the high-availability operation components 526(1)-526(*j*) on an active composed-node may send alert signals to the network when any component of that active composed-node fails or is non-operative. Further, each of the high-availability operation components 526(1)-526(*j*) of an active composed-node may periodically send a health signal to the network when that active composed-node is operating normally as expected. The high-availability operation components 526(*j*+1)-526(*n*) monitors the activities of the high-availability operation components 526(1)-526(*j*). When the high-availability operation components 526(*j*+1)-526(*n*) detects the presence of an alert signal or the absence of a health signal from any one of the high-availability operation components 526(1)-526(*j*), the high-availability operation components 526(*j*+1)-526(*n*) convert a passive composed-node to an active composed-node and, then, use the newly converted active composed-node to replace the failed active composed-node.

Figure 8:
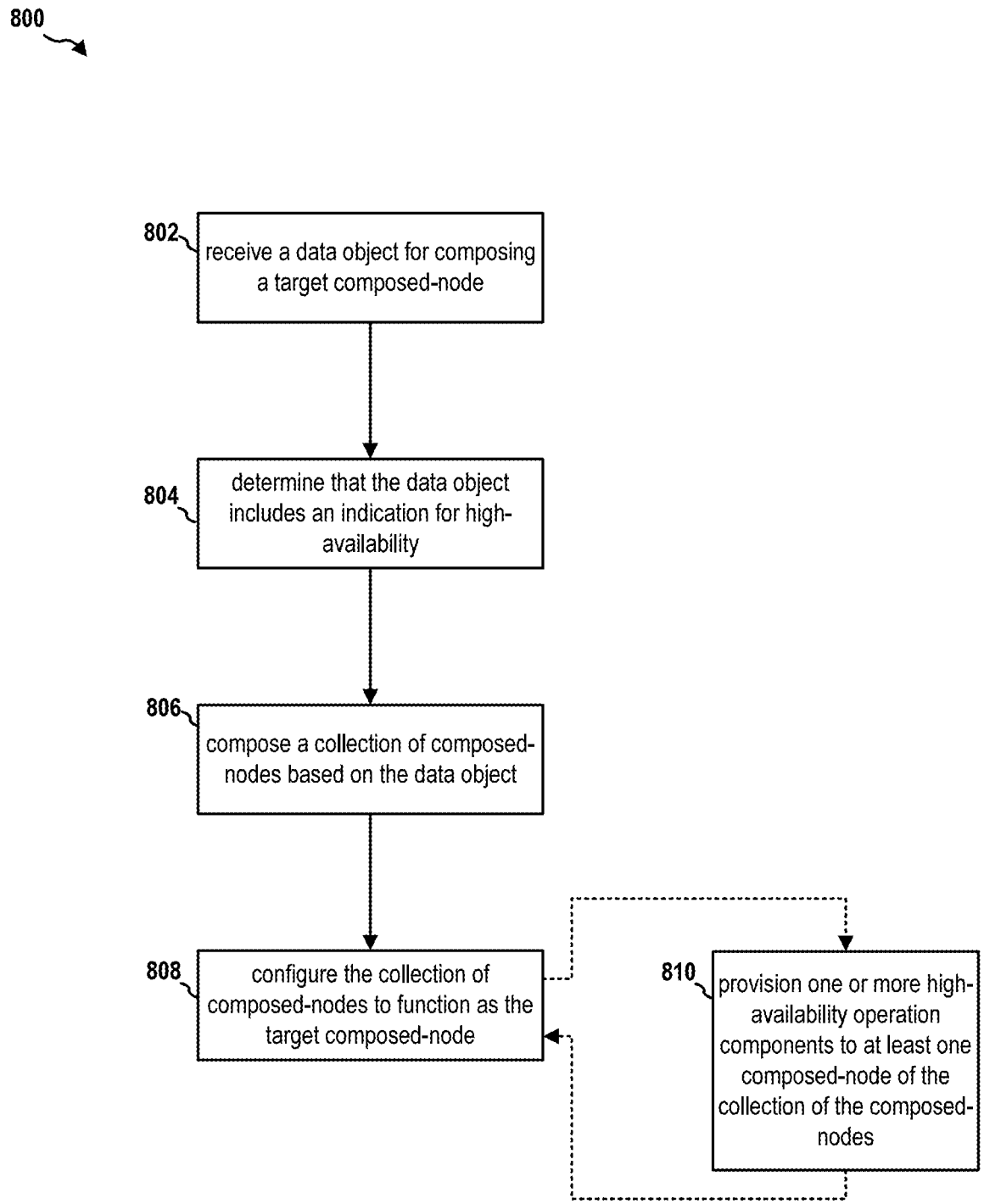
FIG. 8 is a flow chart of a method (process) for building a high-availability node.

FIG. 8 is a flow chart 800 of a method (process) for building a high-availability node. The method may be performed by a pod manager (e.g., the pod manager 178 and the apparatus 178'). In certain configurations, at operation 802, the pod manager receives a data object for composing a target composed-node (e.g., a database server). At operation 804, the pod manager determines that the data object includes an indication for high-availability. At operation 806, the pod manager composes a collection of composed-nodes (e.g., the composed-nodes 511(1)-511(*n*)) based on the data object. At operation 808, the pod manager configures the collection of composed-nodes to function as the target composed-node.

In certain configurations, each composed-node of the collection of composed-nodes has a same hardware configuration (e.g., the hardware platform 524) in accordance with the data object. In certain configurations, the target composed-node is requested to provide a service. In certain configurations, each composed-node of the collection of composed-nodes has a same software configuration (e.g., the OSes 540(1)-540(*n*) and the service components 522(1)-522(*n*)) to provide the service.

In certain configurations, the collection of composed-nodes includes at least two composed-nodes. In certain configurations, the to configure the collection of composed-nodes in operation 808, at operation 810, the pod manager provisions one or more high-availability operation components (e.g., the high-availability operation components 526(1)-526(*n*)) to at least one composed-node of the collection of the composed-nodes. The one or more high-availability operation components operates the collection of composed-nodes to handle tasks directed to the target composed-node. In certain configurations, to operate the collection of the composed-nodes, the one or more high-availability operation components allocate the tasks among the collection of the composed-nodes. In certain configurations, the collection of composed-nodes is configured to operate in an active-active mode. In certain configurations, the collection of composed-nodes is configured to operate in an active-passive mode. In certain configurations, the collection of composed-nodes is composed with hardware elements from different computing racks.

Figure 9:
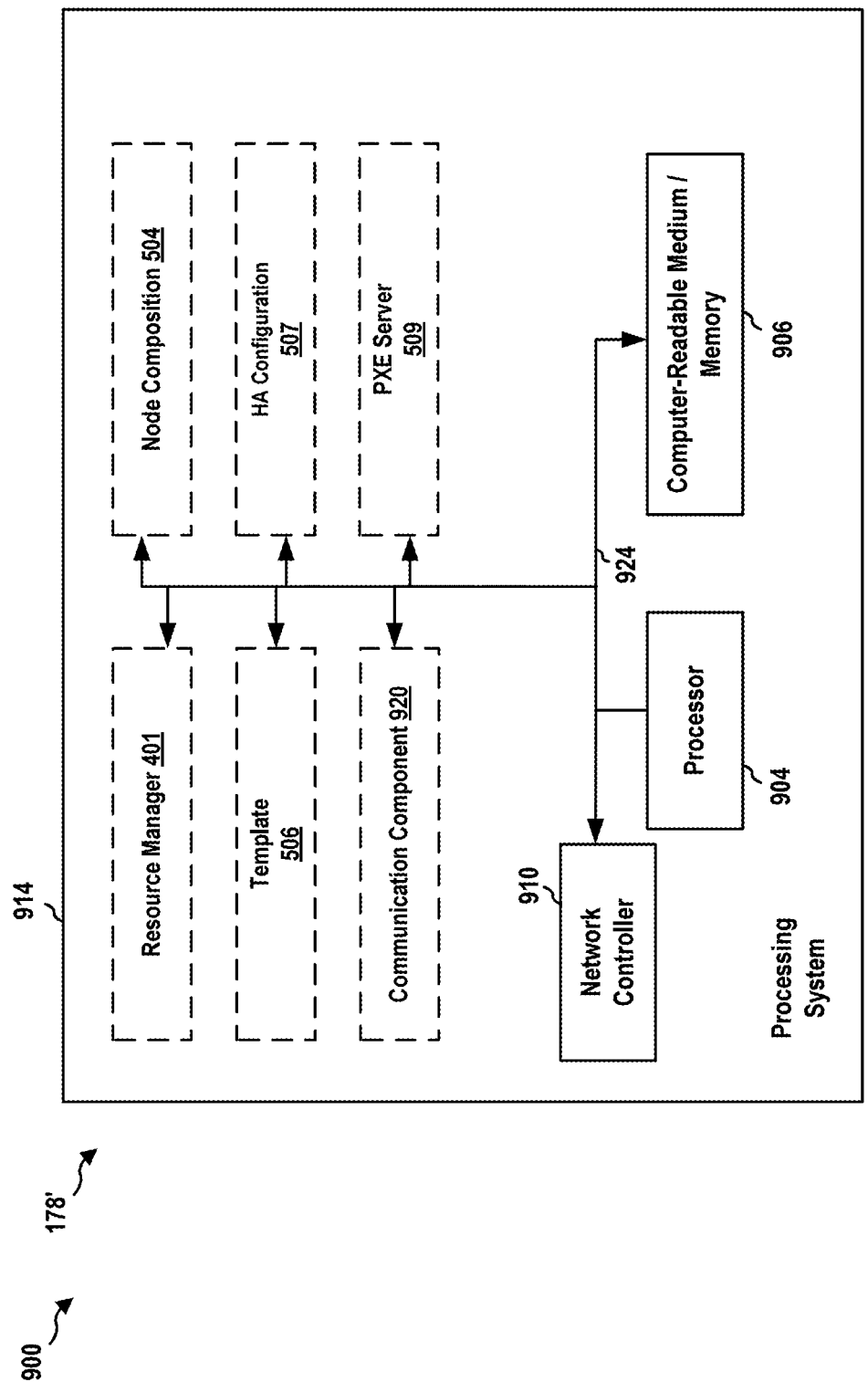
FIG. 9 is a diagram illustrating an example of a hardware implementation for an apparatus.

FIG. 9 is a diagram 900 illustrating an example of a hardware implementation for an apparatus 178' employing a processing system 914. The apparatus 178' may implement the pod manager 178. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by a processor 904, a network controller 910, and a computer-readable medium/memory 906. In particular, the computer-readable medium/memory 906 may include the memory 114 and the storage 117. The bus 924 may also link various other circuits such as timing sources, peripherals, voltage regulators, and power management circuits, which are well known in the art, and therefore, will not be described any further.

The processing system 914 may be coupled to the network controller 910. The network controller 910 provides a means for communicating with various other apparatus over a network. The network controller 910 receives a signal from the network, extracts information from the received signal, and provides the extracted information to the processing system 914, specifically a communication component 920 of the apparatus 178'. In addition, the network controller 910 receives information from the processing system 914, specifically the communication component 920, and based on the received information, generates a signal to be sent to the network. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system further includes at least one of the resource manager 401, the node-composing component 504, the template component 506, the high-availability configuration component 507, and the PXE server 509. The components may be software components running in the processor 904, resident/stored in the computer readable medium/memory 906, one or more hardware components coupled to the processor 904, or some combination thereof.

The apparatus 178' may be configured to include means for performing operations described supra referring to FIG. 8. The aforementioned means may be one or more of the aforementioned components of the apparatus 178 and/or the processing system 914 of the apparatus 178' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of managing composed-nodes of a computing pod, comprising:
   receiving a data object for composing a target composed-node and specifying a hardware configuration of the target composed-node;
   determining that the data object includes an indication for high-availability;
   composing a collection of composed-nodes that includes at least two composed-nodes each being a hardware node in accordance with the hardware configuration specified by the data object, including: for a given node of the collection of composed-nodes, selecting each hardware element of the given node from a pool of hardware elements of a same type available in one or more computing racks in accordance with the hardware configuration; and
   subsequent to the composing the collection of composed-nodes, configuring the collection of composed-nodes to function as the target composed-node, including:
      provisioning one or more high-availability operation components to each of the at least two composed-nodes, the one or more high-availability operation components operating the at least two composed-nodes to handle tasks directed to the target composed-node, and
      provisioning two or more virtual machines (VMs) to each of the at least two composed-nodes.

2. The method of claim 1, wherein each composed-node of the collection of composed-nodes has a same hardware configuration in accordance with the data object.

3. The method of claim 1, wherein the target composed-node is requested to provide a service, wherein each composed-node of the collection of composed-nodes has a same software configuration to provide the service.

4. The method of claim 1, wherein the operating the collection of the composed-nodes includes:
   allocating the tasks among the collection of the composed-nodes.

5. The method of claim 1, wherein the collection of composed-nodes is configured to operate in an active-active mode.

6. The method of claim 1, wherein the collection of composed-nodes is configured to operate in an active-passive mode.

7. The method of claim 1, wherein the collection of composed-nodes is composed with hardware elements from different computing racks.

8. An apparatus for managing composed-nodes of a computing pod, comprising:
   a memory; and
   at least one processor coupled to the memory and configured to:
      receive a data object for composing a target composed-node and specifying a hardware configuration of the target composed-node;
      determine that the data object includes an indication for high-availability;
      compose a collection of composed-nodes that includes at least two composed-nodes each being a hardware node in accordance with the hardware configuration specified by the data object, wherein the at least one processor is further configured to: for a given node of the collection of composed-nodes, select each hardware element of the given node from a pool of hardware elements of a same type available in one or more computing racks in accordance with the hardware configuration; and
   subsequent to the composing the collection of composed-nodes, configure the collection of composed-nodes to function as the target composed-node, wherein the at least one processor is further configured to:
      provision one or more high-availability operation components to each of the at least two composed-nodes, the one or more high-availability operation components operating the at least two composed-nodes to handle tasks directed to the target composed-node, and
      provision two or more virtual machines (VMs) to each of the at least two composed-nodes.

9. The apparatus of claim 8, wherein each composed-node of the collection of composed-nodes has a same hardware configuration in accordance with the data object.

10. The apparatus of claim 8, wherein the target composed-node is requested to provide a service, wherein each composed-node of the collection of composed-nodes has a same software configuration to provide the service.

11. The apparatus of claim 8, wherein to operate the collection of the composed-nodes, the one or more high-availability operation components are configured to:
 allocate the tasks among the collection of the composed-nodes.

12. The apparatus of claim 8, wherein the collection of composed-nodes is configured to operate in an active-active mode or an active-passive mode.

13. A non-transitory computer-readable medium storing computer executable code for managing composed-nodes of a computing pod, comprising code to:
 receive a data object for composing a target composed-node and specifying a hardware configuration of the target composed-node;
 determine that the data object includes an indication for high-availability;
 compose a collection of composed-nodes that includes at least two composed-nodes each being a hardware node in accordance with the hardware configuration specified by the data object, wherein the code is further configured to: for a given node of the collection of composed-nodes, select each hardware element of the given node from a pool of hardware elements of a same type available in one or more computing racks in accordance with the hardware configuration; and
 subsequent to the composing the collection of composed-nodes, configure the collection of composed-nodes to function as the target composed-node, wherein the code is further configured to:
  provision one or more high-availability operation components to each of the at least two composed-nodes, the one or more high-availability operation components operating the at least two composed-nodes to handle tasks directed to the target composed-node, and
  provision two or more virtual machines (VMs) to each of the at least two composed-nodes.

14. The non-transitory computer-readable medium of claim 13, wherein each composed-node of the collection of composed-nodes has a same hardware configuration in accordance with the data object.

15. The non-transitory computer-readable medium of claim 13, wherein the target composed-node is requested to provide a service, wherein each composed-node of the collection of composed-nodes has a same software configuration to provide the service.

16. The non-transitory computer-readable medium of claim 13, wherein to operate the collection of the composed-nodes, the one or more high-availability operation components are configured to:
 allocate the tasks among the collection of the composed-nodes.

17. The non-transitory computer-readable medium of claim 13, wherein the collection of composed-nodes is configured to operate in an active-active mode or an active-passive mode.

* * * * *